(12) United States Patent
Herdman

(10) Patent No.: US 7,558,788 B1
(45) Date of Patent: Jul. 7, 2009

(54) SYSTEMS AND METHODS FOR DISTRIBUTING PERSONALIZED INFORMATION OVER A COMMUNICATIONS SYSTEM

(75) Inventor: Rachelle B. Herdman, Bellingham, WA (US)

(73) Assignee: Clarity Health, Inc., Bellingham, WA (US)

( * ) Notice: Subject to any disclaimer, the term of this patent is extended or adjusted under 35 U.S.C. 154(b) by 271 days.

(21) Appl. No.: 11/523,183

(22) Filed: Sep. 18, 2006

Related U.S. Application Data

(63) Continuation of application No. 09/934,955, filed on Aug. 21, 2001, now Pat. No. 7,110,994, which is a continuation of application No. 09/798,276, filed on Mar. 2, 2001, now abandoned.

(60) Provisional application No. 60/188,932, filed on Mar. 9, 2000, provisional application No. 60/188,670, filed on Mar. 11, 2000.

(51) Int. Cl.
*G06F 17/00* (2006.01)
(52) U.S. Cl. .............................. 707/3; 707/101; 707/102
(58) Field of Classification Search .................... 707/3, 707/101, 102
See application file for complete search history.

(56) References Cited

U.S. PATENT DOCUMENTS

| | | | | |
|---|---|---|---|---|
| 4,464,122 A | * | 8/1984 | Fuller et al. | 434/262 |
| 5,577,186 A | | 11/1996 | Mann et al. | |
| 5,692,501 A | * | 12/1997 | Minturn | 600/301 |
| 6,029,141 A | | 2/2000 | Bezos et al. | |
| 6,266,668 B1 | | 7/2001 | Vanderveldt et al. | |
| 6,456,303 B1 | * | 9/2002 | Walden et al. | 715/705 |
| 6,681,344 B1 | | 1/2004 | Andrew | |
| 2002/0049617 A1 | * | 4/2002 | Lencki et al. | 705/4 |

OTHER PUBLICATIONS

Pages from wholefoodsmarket.com web site (16 pages).
Pages from healthdirector.com web site (11 pages).
Pages from cookinglight.com web site (6 pages).

* cited by examiner

*Primary Examiner*—Sana Al-Hashemi
(74) *Attorney, Agent, or Firm*—Michael R. Schacht; Schacht Law Office, Inc.

(57) ABSTRACT

A system for distributing information over communications systems comprising a question database, a solution database, a set of protocols, a user information system, a selecting system, and a filtering system. The question database contains questions related to the information to be distributed. The solution database contains solution elements related to the information to be distributed. The set of protocols links at least one of the questions in the question database with at least one of the solution elements in the solution database. The user information system allows a user to enter user data related to the user. The selecting system allows the user to select one or more questions from the question database to generate a set of selected questions. The filtering system generates a customized list of solution elements based on the selected questions, the set of protocols, and the user data such that the customized list of solution elements contains at least one solution element specifically related to the user.

21 Claims, No Drawings

SYSTEMS AND METHODS FOR DISTRIBUTING PERSONALIZED INFORMATION OVER A COMMUNICATIONS SYSTEM

RELATED APPLICATIONS

This application is a continuation of U.S. patent application Ser. No. 09/934,955 filed Aug. 21, 2001, U.S. Pat. No. 7,110,994 issued Sep. 19, 2006, which is a continuation of U.S. patent application Ser. No. 09/798,276 filed Mar. 2, 2001, abandoned, which claims priority of U.S. Provisional Patent Application Ser. Nos. 60/188,932 filed on Mar. 9, 2000, and 60/188,670 filed on Mar. 11, 2000.

FIELD OF THE INVENTION

The present invention relates to the distribution of information over a communications system such as the internet and, more specifically, to a dynamic information system that employs an interactive computer program that selects and provides a customized set of responses tailored to a particular combination of answers to questions contained in a questionnaire.

BACKGROUND OF THE INVENTION

Real-world life is complex, and situations requiring information often involve multiple questions or problems. When information is presented on-line, this information is usually presented as a static "library" of content and information. Such static systems do not allow the performance of services and/or presentation of information to be tailored to a user's unique requirements. These systems do not fully exploit the capacity of communications systems such as the internet to sort, integrate, collate, and/or prioritize the best of multiple solution possibilities from multiple sources into simple steps tailored for and easily implemented by any customer. These systems also do not teach each user accessing the information about practical and self-directed actions to improve their life and enhance their knowledge in their specific areas of interest and thereby further today's trend towards self-education and empowerment.

Accordingly, it is a goal of the present invention to obtain improved systems and methods for distributing information over a communications system.

SUMMARY OF THE INVENTION

The present invention is preferably a system for distributing information over communications systems comprising a question database, a solution database, a set of protocols, a user information system, a selecting system, and a filtering system. The question database contains questions related to the information to be distributed. The solution database contains solution elements related to the information to be distributed. The set of protocols links at least one of the questions in the question database with at least one of the solution elements in the solution database. The user information system allows a user to enter user data related to the user. The selecting system allows the user to select one or more questions from the question database to generate a set of selected questions. The filtering system generates a customized list of solution elements based on the selected questions, the set of protocols, and the user data such that the customized list of solution elements contains at least one solution element specifically related to the user.

The present invention may thus be implemented as systems and methods that take multiple questions within one field of endeavor and respond with a customized set of solution elements that make practical sense and have additive value when used together.

Real-world life is complex, and in any situation requiring information there are usually multiple questions or problems to be solved. Accordingly, rather than a static "library" of content and information, the systems and methods of the present invention yield a dynamic internet resource behaving like an interactive book that tailors its content to the customer's particular set of requests. The present invention may be applied to any area of expertise, and is particularly suited to, though not limited to, self-directed activities for which the customer seeks practical guidance and information to proceed—e.g. cooking, gardening, car repair.

The system of the present invention may be implemented by a list of frequently-asked questions. For each question a "Protocol" is compiled and stored. The Protocol consists of the most effective and/or popular solutions in the field of endeavor associated with each of the questions. Using a Questionnaire, the customer can select and submit questions. Based on the "Protocols", the program first retrieves the component solutions for each question, which are weighted in the system. These solutions may then be filtered by sorting, collating, and prioritizing according to weighting, and the program selects those with the highest cumulative weighting (those most relevant to the group of questions), and eliminates those with least weighting.

The customer is then presented with a customized set of the best answers to cover the particular combination of questions they selected. Purely educational background material may also be presented to the user. The program then walks the customer through how to implement these solutions, step by step, including practical action such as complete recipes, geographically local resources, and links to online stores and research and commercial sites, etc. The customer's data is stored securely, so that over sequential site visits they can receive related or more advanced material as their requirements evolve and change.

The benefits of the present invention may include one or more of the following:

The present invention implements a holistic philosophy that includes and aggregates different philosophies and approaches. For example, a fish recipe may be accompanied with—or have links to—protein and calorie analysis, a Chinese medicine perspective on health benefits of ingredients, a history of the recipe's origin, and a myth about symbolism of the fish image.

The information stored and distributed using the systems and methods of the present invention is personalized. The focus is on the customer, not the topics. Instead of a "library" of impersonal information on each separate topic, the content offered at each site visit is selected and tailored precisely to fit the individual request—like a personal guidebook, that changes as the customer's requests change. For example, in the context of a menu creation system implementing the principles of the present invention, a customer requiring "Pacific Northwest" style and "Rapid Preparation". The program walks the user through learning more and implementing the recommendations in a very practical "how-to" way.

By integrating information and the replies to multiple questions, a cohesive and multi-faceted yet also streamlined response is delivered. One single solution may satisfy more than one problem, for instance a recipe may be both vegetarian and Pacific Northwest style. The system eliminates overlap and irrelevancies, and selects and prioritizes the best combination of answers to most effectively address all interests the customer inputs.

The present invention may be implemented as a system or method that is independent of any one commercial company, product line, method, philosophy or school. While it may offer links to a variety of high quality informational or commercial sites, to enable the customer to easily and knowledgeably implement recommendations, the prime objective is to offer personalized education and information.

The present invention may be implemented as an educational, not diagnostic, tool. The customer is expected to responsibly investigate any persistent concerns—from nutritional to automobile—and to monitor the effectiveness of action taken based on information provided. Agreement with a Disclaimer may be required before proceeding to receive information. The program can teach about practical, safe measures likely to help each unique situation, and can offer detailed guidance to start and use them, but does not prescribe or assume responsibility for the customer's actions.

DETAILED DESCRIPTION OF THE INVENTION

The present invention can be embodied in a number of different forms, and several of these will be described in detail herein. The following examples are to be considered illustrative of the scope of the present invention, but the scope of the present invention is not restricted by these examples.

I. Menu Creation Examples

One customer may want a menu that is (a) Vegetarian, and (b) has a Pacific Northwest theme, and (c) can be made in less than one hour. A Home Cooking website using the systems and methods of the present invention may have a Database of recipes. "Vegetarian", "Pacific Northwest", and "Rapid-Preparation" Protocols would include the highest rated and most widely-favored recipes for the category. There may be overlap, for instance a recipe may be both quick and also vegetarian. At the customer's request, the individual recipes linked to the questions "Vegetarian", "Pacific Northwest" and "Rapid Preparation" will be retrieved. Each recipe is weighted according to, perhaps, how characteristically Northwest or how fast to prepare it is.

The program then adds their weightings, giving most weight to recipes appearing more than once, and prioritizes and collates. The customer is presented with a menu, from hors d'oeuvre to dessert, featuring the recipes that satisfy all their requirements to the greatest degree. Rather than having to look through one book on vegetarian cooking, another on Northwest food, and yet another on quick meals, this program synthesizes a personalized "cookbook" to answer this customer's particular set of requests. Another customer may want a menu that is quick and in Pacific Northwest style, but also features fish. Here the recipes linked to "Northwest" and "Rapid Preparation" will again be retrieved, along with "Fish" recipes, resulting in a somewhat different customized menu.

The present invention is preferably implemented as a web site or collection of web sites available over the internet, and that example will be described in detail below. The present invention may, however, be embodied in the context of other communications systems.

Upon entering a web site implementing the present invention in the context of a menu creation example, the user will initially be presented with a Home and Introduction page. The Home and Introduction page will give provide general information to the user, perhaps saying: "Who We Are and What We Do . . . ", followed by a description of the particular business or service. The Home and Introduction will typically explain to the user how the web site generally operates. In particular, this Home and Introduction page will state that the web site will generate, in response to the user's particular combination of questions and interests, a "Custom Book" containing the most effective, easy and relevant solutions to cover all the customer's questions. The user will then be presented with a button, perhaps labeled "Click to proceed', which leads to a second page entitled the Questionnaire page.

On the questionnaire page, the user is presented with a first questionnaire. The first questionnaire includes boxes to check to allow the user to input relevant personal characteristics such as time available to cook, level of cooking experience, and other variables. Next the user is presented with a second or main questionnaire containing the list of questions for which expert information is available, such as "Fish recipes", "Vegetarian recipes", or "Pacific Northwest recipes". For each question selected, there will, in upcoming versions of the invention, be a second or even third tier of questions (e.g. "Vegetarian" with emphasis on (i) leafy greens, or (ii) casseroles), allowing several steps to narrow down the question, providing more specific answers. The customer selects questions by clicking on boxes, icons, or images. Perhaps 30-40 choices may be presented in an initial version of the invention, then more added as system develops.

A button, again perhaps labeled "Click to proceed' will then be clicked, leading the user to a third page entitled "To Open Your Custom Book (abbr. herein as "CB"). The user is presented with the outside cover of their "Custom Book", perhaps as a graphic with their first name on, and asked "Would you like to open it?" If they click on a button saying "Yes", the next paragraph may include one or more threshold requirements such as a payment method and/or disclaimer. For example, the user may be presented with one or more panels labeled and implemented as follows:

"There is an $$ (x) dollar fee for this personalized information service"—and boxes are shown to enter credit card information, which must be validated to continue the program DISCLAIMER box must be checked: e.g. "The information on this website should not in any way be used as a substitute for the advice of a professional. Neither our expert team or guest contractors shall be liable or responsible to any person or entity for any loss or damage caused, or alleged to be have been caused, directly or indirectly by the information or ideas contained, suggested, or referenced on this web site. We offer an educational service only. While we understand everything presented on this site to be completely safe, we recommend you consult a professional"—Links can then be provided to the appropriate referral sources.

Once all boxes are satisfactorily filled in, the completed questionnaire is submitted and the program sorts, collates, organizes and prioritizes answers to the user's unique combination of inquiries. The program then gathers this information into what may be referred to as a Custom Book.

The program next proceeds to a fourth page, perhaps entitled "Custom Book". The first "Chapter" will reveal a customized list of the solutions that together are most effective for all the questions asked. The customer is given many helpful tips in a warm and personal tone. The customer's data, questions and "Custom Book" solutions are securely stored. At return visits to the site the customer can input new information or requests, and (perhaps for fee) turn to the next chapter of their "CB", thus building upon their knowledge.

The customized list of solutions presented in the "Custom Book" is made up of several selected individual solutions such as recipes (exact number to be determined by the website adopting this system). Each individual solution is a piece of information that will be referred to herein as a "Solution Element" in the Database. The Solution Elements are linked to the Questions in what is referred to herein as a Protocol. In the present example, the Protocol associates Questions, which are categories of food such as vegetarian or Pacific Northwest, with Solution Elements, which are recipes that fall within the category of food. The Protocols may associate one Solution Element with more than one Question; that is, a recipe may be categorized as both vegetarian and Pacific Northwest. The Protocols may also associate more than one Solution Element with each Question; that is, more than one the Solution Elements or recipe may be associated with a specific Question or cooking category.

The program eliminates duplication and presents the customer with a customized list of the Solution Elements, selected by weighting, that most strongly correspond to all selected Questions. In particular, the customized list of Solution Elements is the result of the program retrieving and prioritizing Solution Elements linked by the Protocols to the plurality of selected Questions. The present invention thus filters the total list of Solution Elements to a customized list of Solution Elements based on the overlap between Protocols associated with the selected Questions and/or weightings associating the Solution Elements more or less strongly with selected Questions.

The fact that a given Solution Element or recipe is identified by more than one Protocol to the selected Questions will increase the likelihood that the given Solution Element will be included in the customized list of Solution Elements. Instead or in addition, the Protocols may include weighted scores that more or less strongly associate the Solution Elements with a given Question. In this case, the customized list of Solution Elements will be constructed using the weighted scores to obtain recipes that strongly satisfy the requirements associated with the selected Questions.

The process of generating the customized list of Solution Elements based either on overlapping Protocols or on the weighted scores defined within the Protocols will be referred to herein as filtering.

As an example of this embodiment of the present invention, a customer requesting food categories such as Fish and Pacific Northwest and Rapid Preparation (Questions) will receive recipes (Solution Elements) linked by Protocols to each of those three food categories. Using the concept of overlapping Protocols, the system will select recipes that are linked by the Protocols to two or even all three customer food category requests. Using the concept of weighting, the system will give preference to recipes that are weighted more heavily. For this example, the user's "Custom Book" presents a customized list of Solution Elements in the form of a menu containing the following recipes:
  Red kale and smoked salmon salad
  Wild salmon with Fiddlehead fern
  Garlic spaghetti with fresh basil and parsley
  Pacific fusion portobello & shiitake mushrooms
  Baked Oregon pears in brandy The recipes in this customized list are each identified by two or more protocols and are the highest-weighted from the Fish, Pacific Northwest, and Rapid Preparation as indicated by the following table. The recipe Solution Elements in the following table implements a simple weighting system: an asterisk (*) indicates recipes that are more strongly associated by a Protocol with a given food category.

| QUESTIONS | PROTOCOLS of SOLUTION ELEMENTS |
| --- | --- |
| FISH RECIPES | *Wild salmon with Fiddlehead fern<br>Chinese prawns with ginger<br>Baked Alaskan cod in sweet onion sauce<br>Broiled garlic snapper<br>Tuna and leek stir-fry |
| PACIFIC NORTHWEST RECIPES | *Pacific fusion portobello & shiitake mushrooms<br>*Traditional Washington bannock bread<br>Red kale and smoked salmon salad<br>Organic blueberry ice cream |
| RAPID-PREPARATION RECIPES | Ruby carrot and beet soup<br>Bok choi and ginger stir-fry with chicken strips<br>*Garlic spaghetti with fresh basil and parsley<br>*Baked Oregon pears in brandy |
| VEGETARIAN RECIPE PROTOCOL | Barley and wild rice tabouli<br>Golden Harvest squash soup<br>Lentil-tarragon pate<br>Northwest blackberry sorbet |

The details of the software program underlying any given implementation of the present invention are not critical, and the following example of such a software program in the context of a menu creation system is not intended to restrict the scope of the present invention.

The following terminology will be used in the following discussion of the software program that underlies this embodiment of the present invention:

| Term | Definition |
| --- | --- |
| Question (Q) | a situation, need, or challenge for which customers seek personalized information and guidance |
| Solution Element (SE) | one single measure, such as (but not limited to) a recipe, or a planting schedule for a home gardener tailored to season and geographical location |
| Link | a connection from a "Question" to a "SE"; each link has a different weighting |
| Protocol | a group of "SE"s linked to each Question, and retrieved in response to submission of that Question |

The following components will be used in the following discussion of the software program that underlies this embodiment of the present invention:

| Component | Description |
| --- | --- |
| web site | conventional. |
| Web Server | conventional; used to format and deliver pages to the customer at the website. |
| Dynamic Server | to act like a "search engine and filter in one". Could be located on Web Server or on separate machine. |
| Database | contains:<br>(1) Questions (with information sentences attached, e.g. benefits of a vegetarian diet, or the history of planting by moon cycles, etc);<br>(2) Solution Elements (also with information sentences attached, e.g. where to purchase ingredients or supplements);<br>(3) Protocols linking Solution elements to Questions, possibly including weighted Links |

The exemplary Menu Creation System will preferably be implemented using the following procedures.

Initially, at the web site, the customer (user), who is someone visiting site wanting information tailored to their request, fills out personal information and selects a UserName & password to allow future access to own confidential data.

The user is next presented with a dynamic page of 30-40 personal questions (no limit on future number as invention evolves) relevant to the personal information entered by the customer is presented at the website. Incompatible combinations of questions are disallowed (e.g. a request for both Vegetarian and Beef recipes for one individual).

The user is then prompted to select one or more Questions for which they want a customized list of the best solutions. Selection is made at the website by clicking buttons or icons or drop-down boxes. Optional in future developments of invention, further icons/clicks will (maybe at return visit to site) take user to 2nd or 3rd tier of questions, for more focus, e.g. low-fat Fish recipes.

The selected "Questions", together with all the customer's personal information, are submitted to the WebServer and Dynamic Server, which check for, and eliminate, conflicts in questions (e.g. Vegetarian and Beef recipes for same individual The WebServer utilizes an underlying database connectivity layer—i.e. "talks" to a sub-program at the Dynamic Server—to construct a query, including ALL customer's selected "Questions" and personal information. This query is then sent to the Database.

In response to the query from the WebServer/Dynamic server, the Database recognizes and retrieves the "Solution Elements". These "SE"s are collated and prioritized based upon the weighting of links that retrieved them, and other factors currently in development. The Database could also eliminate duplication and ensure some form of conflict resolution so that conflicting "SE"s would not be presented to customer. There would be "Prohibitive links" in the Database to "Solution Elements" disallowed, e.g. beef soup could not be retrieved for vegetarian customer. The weights of "SE"s are then added and are cumulative.

The weighted and collated "SE"s are then sent back to the Dynamic Server/WebServer, to format and create a dynamic web page.). Alternatively Active Server Pages may be implemented.

The result (containing all the "Solution Elements" for this customer, ranked according to weighting) is presented as the "Custom Book" at the website.

All personalized data associated with a particular user and stored in the Database server for easy retrieval at a later time.

As an alternative to or enhancement of the first embodiment, each "Solution Element" bears several tags, each of different weighting and each tag corresponding to one "Question". When a "Question" is included in a query, the Database will retrieve all the "SE"s with a corresponding tag. The weightings of the "SE"s are additive according to the score on their tags. In the response presented to the customer, those with strongest cumulative weighting are given highest priority. This alternative weighting process is represented in Appendix 1 attached hereto.

II. Holistic Health Education Examples

The present invention may also be implemented as an interactive computer program and internet system linked to a commercial web site, providing customized step-by-step holistic health education. Rather than a static "library" of content and information, this is a dynamic internet resource that behaves like an interactive book that tailors its content to the customer's particular set of requests. For each health condition addressed, a health education system of the present invention presents the best natural health approaches (solutions)—including diet, vitamins, safe herbs—our "Protocols".

The health education system may begin with a Questionnaire requesting information about the user. The user then queries the system for health concerns. In response to the user's particular combination of health questions, our program sorts and prioritizes the solutions, which are weighted in our system, and selects those with highest cumulative weighting for all queried health conditions. The customer is presented with a customized set of answers—a thorough and simple list of the most effective alternative health measures (in widespread use) that in general best help all the health concerns they ask about. Educational background material relevant to the protocols may be presented to the user.

The health education system then walks the customer through how to implement these measures, including meal plans, local store addresses, links to research & commercial sites, etc. The customer's information is stored securely, so that over sequential site visits, their education can progress as their requests and results evolve.

A health education system as described in this embodiment of the present invention provides one or more of the following benefits to the user.

The health education system is takes a holistic approach that includes diet, herbs, vitamins, mind-body approaches, and practical guidelines for obtaining thorough medical evaluation. The system can be linked to scientific studies and natural medicine philosophies of East and West.

The health education system is personalized to a particular user. The focus is thus on the user, not the ailment, resulting in a health resource particularly addressing the user's situation. Instead of a "library" of impersonal information on each separate health topic, the content offered at each site visit is selected & tailored precisely to fit the individual request—like a personal alternative health guidebook, that changes as the customer's requests change. The simplest measures that help most people most often, derived from our experts' clinical experience and extensive research experience, are presented as an eminently user-friendly list. The program walks the user through learning more and implementing the changes in a very practical "How-To" way.

The health education system of this embodiment integrates information on multiple health concerns. Many alternative measures, from diet changes to herbs, are invaluable to prevent or help more than one health condition. Unlike specialty sites or books on only ONE condition, our system eliminates overlap and irrelevancies, and selects and prioritizes the best combination of alternative health measures to most effectively address all health concerns the customer inputs, e.g. high cholesterol and enlarged prostate problems and acid reflux.

The exemplary health education system need not be affiliated with any one commercial company, product line, healthcare method, philosophy or school. While it may offer links to a variety of high quality information or commercial sites, to enable the customer to easily and knowledgeably implement health changes, the prime objective is to offer personalized education & information.

A health education system of the present invention is educational, not diagnostic. This system of the present invention expects the customer to responsibly investigate any symptoms and monitor health improvements, and agreement with a Disclaimer is necessary to proceed to receiving information.

The site can TEACH about the simple, SAFE measures most likely to help each unique situation, and offer detailed guidance to start and use them.

A health education system of the present invention thus:

provides an easy internet tool available in every living room giving users everywhere customized information tailored to their unique health concerns;

consolidates the best of alternative health measures into simple steps that anyone can easily do to improve their health;

enables every person of any age to easily and pleasurably include safe natural health measures in daily life, to help prevent illness and enhance health and productivity, and feeling of wellbeing;

empowers and teaches each customer about self-care and practical tools for maximizing health—from diet changes to knowledge about their bodies, thereby furthering today's trend towards patient-directed healthcare, self-education and prevention.

The present invention is preferably implemented as a website accessible over the internet. The web site contains a sequence of pages as described below.

Upon entering the web site, the user enters a first page referred to as the Home and Introduction page. The Home and Introduction page may contain the following introduction:

"Who We Are and What We Do . . . Hallo and welcome to your online personalized alternative health guide, a teaching center providing you with customized information in reply to your individual requests. Starting here, we will walk you through the most effective and easy alternative approaches for your own unique combination of health questions—This is the alternative health guide tailored to you. We offer:

A customized guide describing the very best combination of simple measures to cover ALL your key health requests, easy to start and use in daily life Our information is distilled from our highly trained consultants' years of clinical experience and from extensive research of the best complementary health COMBINATIONS that really work in practice for many common conditions You may truly benefit from Naturopathic Medicine if you have:

women's health concerns at any age, from PMS to menopausal symptoms fatigue or immune problems men's health and prostate concerns digestive and eating disorders, constipation high cholesterol, heart disease, high blood pressure anxiety, insomnia, depression sinusitis, asthma, bronchitis, respiratory problems osteoporosis, arthritis, skin symptoms We'll tell you about:

FOODS to eat more often and explain their health benefits, meal plans for eating in or out; quick delicious recipes for each health concern, & shopping lists—drawing upon Western, Chinese and Ayurvedic traditions VITAMINS and MINERALS in most absorbable forms with safe daily doses HERBS of West and East, with safe-use tips, and how they work to encourage your body to repair itself MIND-BODY HEALTH: from daily walking to mindfulness and meditation, simple measures specific to each health concern to soothe body and mind BOOKS most relevant, lively, and informative for your health interests NATURAL HORMONES including gynecological & thyroid hormones, that you may want to ask your doctor about, biologically identical to those our bodies produce; individually prescribed for menstrual, menopausal, and fatigue symptoms "ASK YOUR DOCTOR", our recommendations for check-ups, the most valuable tests to monitor the health concerns you are learning about, and remedies you and your doctor may want to consider"

The Introduction Page then explains how to use the site: in response to the user's particular combination of health questions and interests, a Custom Health Book will be generated, containing the most effective & easy alternative care steps to cover all the customer's health concerns. The user will then click a button labeled "Click to proceed" and then be linked to second page entitled the "Questionnaire".

On the Questionnaire page, the user is presented with an Introductory Questionnaire, with boxes to check to describe gender, age group, height, weight, preferred activity level, and many other variables. Next is a list of health conditions for which expert information is available. For each health condition selected, there MAY in subsequent versions of the invention be a second or even third tier of questions (e.g. PMS with choice of (i) physical symptoms, or (ii) mood changes), thus 2-4 steps to narrow down the health question, to give more specific answers.

The Questionnaire page also presents a list of general health concerns from which the user selects specific health concerns of relevance. The customer selects by clicking on boxes, icons, or images. More health concerns may be added to the list as system develops. Examples of health conditions include, but are not limited to:

High cholesterol

CardioVascular protection

Prostate enlargement (benign)

PMS

Menopause symptoms

Food cravings

Heartburn, acid reflux

Irritable Bowel Syndrome

Allergies

Acne

Eczema

Sinusitis

Asthma

The user then proceeds to page 3, which may be entitled "To Open Your Custom Health Book": (abbr. herein as "CHB"). The exemplary health education system then sorts, collates, organizes and prioritizes answers to the user's unique combination of inquiries, and gathers this information into a "Custom Health Book". The user is presented with the outside cover of this "book", perhaps as a graphic with his/her first name on, and asked "Would you like to open it?"

If the user clicks on a button saying "Yes", the next paragraph says and may contain the following requests for payment and/or disclaimers:

"There is an $$ (x) dollar fee for this personalized teaching service"—and boxes to enter credit card information, which must be validated to continue the program DISCLAIMER box must be checked: "The information on this website should not in any way be used as a substitute for the advice of a physician or other licensed health care practitioner. Our expert team and guest contractors shall not be liable or responsible to any person or entity for any loss or damage caused, or alleged to be have been caused, directly or indirectly by the information or ideas contained, suggested, or referenced on this web site. We offer an educational service only. While we understand everything presented on this site to be completely safe, we recommend you consult a licensed Naturopathic Physician or M.D. before using any alternative remedies"—Links can then be offered to the American Association of Naturopathic Physicians and other referral sources.

Once all boxes are satisfactorily filled in, the user then proceeds to page four, which may be entitled "Your Custom Health Book". Within seconds, a graphic appears showing a book cover opening. The first "Chapter" (of the user's healing story) will reveal a list of the alternative health measures that are together most effective for ALL the conditions the user asked about. The user is given many helpful tips in a warm and personal tone for understanding the health conditions asked about, for what to expect from natural health measures, and taught that health improves gradually, step by step, over days and weeks and months. Every 4 (??) weeks s/he can return, input progress & new health information or requests, and (for fee) turn to the next chapter of his/her "CHB".

The health steps provided in the "CHB", derived from our Protocols and matched to the user's selections, will include approximately 12-15 Solution Elements (exact number to be determined as system develops), usually with at least one dietary measure, one vitamin or mineral item, one herb. Each Solution Element is ONE of the following examples (NOT an exhaustive list):

A FOOD to REDUCE—with weekly maximums & delicious substitutes suggested:

Alcohol, coffee, red meat . . . etc

A FOOD to eat OFTEN such as Soy, fish, salad . . . oats, ginger . . . green tea
   with amounts & frequencies—weekly menus, shopping lists
   links to an on-line RECIPE BOOK (with static or video illustrations)
   maybe links to online healthfood stores and groceries A VITAMIN or A MINERAL (or formula)
   e.g. Vitamin X 600-750 once daily with food
   Vitamin Y 2 mg each morning
   Mineral Z: 40 mg twice daily, best between meals An HERB such as Hawthorn or Saw Palmetto or Black Cohosh
   with amounts, timing during day, best features to look for on labels, etc
 Links to several online supplement/herb stores or brands—product-INDEPENDENT
    LINK: to site with information on Drug-Herb-Vitamin Interactions*

A MISCELLANEOUS SUPPLEMENT
   e.g. Flax seed oil capsules
   CoEnzyme Q 10, X mg each morning A LIFESTYLE/EXERCISE
   e.g. Walking
   Hydrotherapy: hot/cold shower A BOOK Recommended reading for the particular health conditions selected, from books with factual information to personal narratives or psychological reflections
   may add links to online book retailers A MIND & SOUL ACTIVITY
   e.g. Suggestions for small acts kindness, easy guide to Meditation, keeping a dream journal, beautifying the home and Feng Shui, music, plants, etc.

SUGGESTED TESTS
   for every customer the section "ASK YOUR DOCTOR if s/he recommends" is included, with medical evaluation suggestions such as blood counts, bone density check, blood pressure twice each week.

The software program underlying the health education system of this embodiment may be implemented in various ways. One exemplary software program for implementing this system will be described below.

The following terminology will be used in the following discussion of the software program that underlies this embodiment of the present invention:

| Term | Definition |
| --- | --- |
| Health Condition (HC) | a common ailment for which customer seeks information on alternative health measures |
| Solution Element (SE) | one single health measure, such as (but not limited to) a named herb with dose and frequency [e.g. herb 'n' taken twice daily with meals] or a food to eat [e.g. 1 cup 4-6 times week], or a blood test to consider asking own physician about |
| Link | a connection from a "HC" to a "SE"; each link has a different weighting |
| Protocol | a group of "SE"s linked to each Question, and retrieved in response to submission of that Question |

The following components will be used in the following discussion of the software program that underlies this embodiment of the present invention:

| Component | Description |
| --- | --- |
| web site | conventional. |
| Web Server | conventional; used to format and deliver pages to the customer at the website. |
| Dynamic Server | to act like a "search engine and filter in one". Could be located on Web Server or on separate machine. |
| Database | contains: (1) "Health Conditions" (with information about each from conventional and alternative medicine perspectives: common causes, pathology, rationale for treatment approaches, etc) (2) Many individual "Solution Elements"; and/or (3) Links: Every "HC" has links to a number of "SE"s, each link with a different weighting |

The exemplary health education system of this embodiment of the present invention will preferably be implemented using the following procedures.

Initially, at the web site, the customer (user), who is someone visiting site wanting information tailored to their request on alternative health, fills out personal information: age, gender, weight, height, activity level, and selects UserName & password, to allow future access to own confidential data.

Next, a dynamic page of "Health Conditions" (no limit on future number as invention evolves) relevant to the personal information entered by the customer is presented at the website. Incompatible questions (e.g. requesting information for an individual with both Menopause and prostate symptoms) are disallowed.

The customer is next prompted to select, for example, three "Health Conditions" for which they want an integrated list of the best alternative medicine measures to cover all three. Selection is made by clicking buttons or icons or drop-down boxes. Optional in future developments of invention, further icons/clicks will (maybe at return visit to site) take user to second or third tier of questions, for more focus, e.g. PMS with moodiness or headache.

These THREE "HEalth Conditions", with all the customer's personal info, are submitted to the WebServer. The WebServer checks for, and eliminates, conflicts in questions (e.g. menopause & prostatitis in same individual). The WebServer utilizes an underlying database connectivity layer to construct a query, including ALL customer's selected "Health Conditions" and personal information to send to the Database.

In response to the query from the WebServer, the Database then recognizes and retrieves the "Solution Elements". These "SE"s are collated and prioritized based upon the weighting of links that retrieved them and other factors such as the number of times a Solution Element is identified by the Protocols as being relevant. The query submitted would also ensure some form of conflict resolution so that conflicting "SE"s would not be presented to customer. There would be "prohibitive links" to "SE"s disallowed, e.g. incompatible combinations of supplements or an herb helping menopause symptoms could not be retrieved for male customer requiring information for his own health. The weights of "SE"s are additive/cumulative.

The collated and weighted "SE"s are sent back to the WebServer, which formats and creates a dynamic web page. Alternatively Active Server Pages may be implemented. The result (containing all the "SE"s for this customer, ranked according to weighting) is presented to the customer. All data associated with a particular user may be stored in the Database server for easy retrieval at a later time.

As an alternative to or enhancement of the first embodiment, each "Solution Element" bears several tags, each of different weighting and each tag corresponding to one "Question" (a "Health Condition" in this example). When a "Question" is included in a query, the Database will retrieve all the "SE"s with a corresponding tag. The weightings of the "SE"s are additive according to the score on their tags. In the response presented to the customer, those with strongest cumulative weighting are given highest priority. This alternative or enhanced weighting process is represented in Appendix One attached hereto.

From the foregoing, it should be apparent that the present invention may be embodied in forms other than those specifically discussed above. The scope of the present invention shall be determined by the claims appended hereto and not the foregoing detailed description.

I claim:

1. A health education system for distributing health information over communications systems, comprising:
    a question database containing a plurality of questions, where each question is related to the health information to be distributed;
    a solution database containing a plurality of solution elements, where each solution element is related to the health information to be distributed;
    a set of protocols linking at least one of the questions in the question database with at least one of the solution elements in the solution database, where the protocols further comprise weighting data that relate the solution elements to the questions;
    a user information system for allowing a user to enter user data related to the user;
    a selecting system for allowing the user to select one or more questions from the question database to generate a set of selected questions; and
    a filtering system for generating a customized list of solution elements based on the selected questions, the set of protocols, the user data, and the weighting data such that the customized list of solution elements contains at least one solution element specifically related to the user.

2. A health education system for distributing information as recited in claim 1, in which the filtering system generates the customized list of solution elements further based on the number of times the solution elements are associated with the selected questions by the protocols.

3. A health education system as recited in claim 1, in which the filtering system determines whether conflicts are present among the user data and the selected questions.

4. A health education system as recited in claim 1, in which at least one of the links is a prohibitive link indicative of incompatibilities among a plurality of solution elements.

5. A health education system as recited in claim 1, in which at least one score is associated with at least one of the solution elements, where the solution elements in the customized list of solution elements are prioritized based on the at least one score associated with at least one of the solution elements.

6. A health education system as recited in claim 1, in which the filtering system prioritizes solution elements in the customized list of solution elements based on the selected questions, the set of links, and the user data.

7. A health education system as recited in claim 1, in which:
    the solution database stores information associated with at least one of the solution elements; and
    the customized list of solution elements further comprises information associated with the solution elements in the customized list of solution elements.

8. A health education system as recited in claim 1, in which:
    a plurality of solution variables are associated with at least one of the solution elements; whereby
    based on the selected questions, the set of links, and the user data the filtering system further determines numerical values associated with the plurality of solution variables associated with at least some of the plurality of solution elements in the customized list of solution elements.

9. A health education system for distributing health information over communications systems, comprising:
    a question database containing a plurality of questions, where each question is related to the health information to be distributed;
    a solution database containing a plurality of solution elements, where each solution element is related to the health information to be distributed;
    a set of protocols linking at least one of the questions in the question database with at least one of the solution elements in the solution database;
    a user information system for allowing a user to enter user data related to the user;
    a selecting system for allowing the user to select one or more questions from the question database to generate a set of selected questions; and
    a filtering system for generating a customized list of solution elements based on the selected questions, the set of protocols, the user data, and the number of times the solution elements are associated with the selected questions by the protocols such that the customized list of solution elements contains at least one solution element specifically related to the user.

10. A health education system as recited in claim 9, in which the filtering system determines whether conflicts are present among the user data and the selected questions.

11. A health education system as recited in claim 9, in which at least one of the links is a prohibitive link indicative of incompatibilities among a plurality of solution elements.

12. A health education system as recited in claim 9, in which at least one score is associated with at least one of the solution elements, where the solution elements in the customized list of solution elements are prioritized based on the at least one score associated with at least one of the solution elements.

13. A health education system as recited in claim 9, in which the filtering system prioritizes solution elements in the customized list of solution elements based on the selected questions, the set of links, and the user data.

14. A health education system as recited in claim 9, in which:
 the solution database stores information associated with at least one of the solution elements; and
 the customized list of solution elements further comprises information associated with the solution elements in the customized list of solution elements.

15. A health education system as recited in claim 9, in which:
 a plurality of solution variables are associated with at least one of the solution elements; whereby
 based on the selected questions, the set of links, and the user data the filtering system further determines numerical values associated with the plurality of solution variables associated with at least some of the plurality of solution elements in the customized list of solution elements.

16. A health education system for distributing health information over communications systems, comprising:
 a question database containing a plurality of questions, where each question is related to the health information to be distributed;
 a solution database containing a plurality of solution elements, where each solution element is related to the health information to be distributed;
 a set of protocols linking at least one of the questions in the question database with at least one of the solution elements in the solution database;
 a user information system for allowing a user to enter user data related to the user;
 a selecting system for allowing the user to select one or more questions from the question database to generate a set of selected questions; and
 a filtering system for generating a customized list of solution elements based on the selected questions, the set of protocols, and the user data, such that the customized list of solution elements contains at least one solution element specifically related to the user; whereby
 at least one of the links is a prohibitive link indicative of incompatibilities among a plurality of solution elements.

17. A health education system as recited in claim 9, in which the filtering system determines whether conflicts are present among the user data and the selected questions.

18. A health education system as recited in claim 9, in which at least one score is associated with at least one of the solution elements, where the solution elements in the customized list of solution elements are prioritized based on the at least one score associated with at least one of the solution elements.

19. A health education system as recited in claim 9, in which the filtering system prioritizes solution elements in the customized list of solution elements based on the selected questions, the set of links, and the user data.

20. A health education system as recited in claim 9, in which:
 the solution database stores information associated with at least one of the solution elements; and
 the customized list of solution elements further comprises information associated with the solution elements in the customized list of solution elements.

21. A health education system as recited in claim 9, in which:
 a plurality of solution variables are associated with at least one of the solution elements; whereby
 based on the selected questions, the set of links, and the user data the filtering system further determines numerical values associated with the plurality of solution variables associated with at least some of the plurality of solution elements in the customized list of solution elements.

* * * * *